US012613380B2

(12) United States Patent
Yamazaki et al.

(10) Patent No.: US 12,613,380 B2
(45) Date of Patent: Apr. 28, 2026

(54) OPTICAL CONNECTOR

(71) Applicants: SUMITOMO ELECTRIC OPTIFRONTIER CO., LTD., Yokohama (JP); SUMITOMO ELECTRIC INDUSTRIES, LTD., Osaka (JP)

(72) Inventors: Masayuki Yamazaki, Yokohama (JP); Masakazu Shigehara, Osaka (JP)

(73) Assignees: SUMITOMO ELECTRIC OPTIFRONTIER CO., LTD., Yokohama (JP); SUMITOMO ELECTRIC INDUSTRIES, LTD, Osaka (JP)

( * ) Notice: Subject to any disclaimer, the term of this patent is extended or adjusted under 35 U.S.C. 154(b) by 187 days.

(21) Appl. No.: 18/276,104

(22) PCT Filed: Feb. 21, 2022

(86) PCT No.: PCT/JP2022/006982
§ 371 (c)(1),
(2) Date: Aug. 7, 2023

(87) PCT Pub. No.: WO2022/181548
PCT Pub. Date: Sep. 1, 2022

(65) Prior Publication Data
US 2024/0103235 A1 Mar. 28, 2024

(30) Foreign Application Priority Data
Feb. 26, 2021 (JP) ................................. 2021-030437

(51) Int. Cl.
*G02B 6/38* (2006.01)

(52) U.S. Cl.
CPC ....... *G02B 6/38875* (2021.05); *G02B 6/3877* (2013.01)

(58) Field of Classification Search
CPC .................................................... G02B 6/3869
See application file for complete search history.

(56) References Cited

U.S. PATENT DOCUMENTS

| | | | |
|---|---|---|---|
| 5,608,828 A | 3/1997 | Coutts et al. | |
| 5,677,976 A | 10/1997 | Takahashi | |

(Continued)

FOREIGN PATENT DOCUMENTS

| | | |
|---|---|---|
| JP | 109-061632 A | 3/1997 |
| JP | 2001-027711 A | 1/2001 |

(Continued)

*Primary Examiner* — Eric Wong
(74) *Attorney, Agent, or Firm* — OLIFF PLC

(57) ABSTRACT

An optical connector includes a ferrule, a ferrule holder, a housing, and an anti-rotation structure. The ferrule includes a through hole that extends in a first direction and holds an optical fiber inside the through hole. The ferrule holder is disposed on the outer periphery of the ferrule and is fixed to the ferrule. The anti-rotation structure is provided inside the housing and outside the ferrule, and prevents rotation of the ferrule about an axis with the ferrule holder. The ferrule holder includes a tubular holder main body that accommodates the ferrule therein, and a flange part that protrudes outward from the outer periphery of the holder main body. The flange part includes a configuration to fit with the anti-rotation structure. A center of the flange part in the first direction is located in a central region of the ferrule in the first direction.

9 Claims, 17 Drawing Sheets

(56) References Cited

U.S. PATENT DOCUMENTS

| | | | | |
|---|---|---|---|---|
| 6,916,120 B2* | 7/2005 | Zimmel | ............... | G02B 6/3871 |
| | | | | 385/78 |
| 9,612,407 B2 | 4/2017 | Kobayashi et al. | | |
| 10,670,814 B2 | 6/2020 | Morishima et al. | | |
| 2002/0106180 A1 | 8/2002 | Takahashi et al. | | |
| 2003/0215191 A1* | 11/2003 | Taira | .................... | G02B 6/3821 |
| | | | | 385/78 |
| 2005/0013553 A1* | 1/2005 | Blasingame | ......... | G02B 6/4292 |
| | | | | 385/88 |
| 2005/0123264 A1 | 6/2005 | Takahashi | | |
| 2014/0050446 A1 | 2/2014 | Chang | | |
| 2018/0314019 A1* | 11/2018 | Tominaga | ............ | G02B 6/3869 |
| 2019/0004254 A1* | 1/2019 | Yoshino | ............... | G02B 6/3897 |
| 2019/0101705 A1 | 4/2019 | Morishima et al. | | |
| 2020/0301081 A1 | 9/2020 | Morishima | | |
| 2021/0333483 A1 | 10/2021 | Morishima | | |

FOREIGN PATENT DOCUMENTS

| | | | |
|---|---|---|---|
| JP | 2002-228842 A | 8/2002 |
| JP | 2002-250840 A | 9/2002 |
| JP | 2005-148250 A | 6/2005 |
| JP | 2007-163548 A | 6/2007 |
| JP | 2008-046433 A | 2/2008 |
| JP | 2017-161836 A | 9/2017 |
| KR | 10-0971306 B1 | 7/2010 |
| WO | 2019/131098 A1 | 7/2019 |
| WO | 2020/149262 A1 | 7/2020 |

* cited by examiner

OPTICAL CONNECTOR

TECHNICAL FIELD

The present disclosure relates to an optical connector.

This application claims the benefit of priority from Japanese Patent Application No. 2021-030437, filed on Feb. 26, 2021, the entire contents of which is incorporates herein by reference.

BACKGROUND ART

Patent Literature 1 discloses an example of an optical connector having a plug receptacle structure (also called a "plug receptacle connector"). In the optical connector, a ferrule that holds a built-in optical fiber (including a connecting body in which a pair of ferrules are integrated) is attached in a housing member of the optical connector with a flange disposed on the outer periphery thereof (for example, refer to FIGS. 5 and 8 of Patent Literature 1). Patent Literatures 2 and 3 also disclose optical connectors having similar configurations.

CITATION LIST

Patent Literature

[Patent Literature 1] Japanese Unexamined Patent Publication No. 2001-027711
[Patent Literature 2] Japanese Unexamined Patent Publication No. H09-061632
[Patent Literature 3] Japanese Unexamined Patent Publication No. 2002-228842

SUMMARY OF INVENTION

The present disclosure provides an optical connector. The optical connector includes a ferrule, a ferrule holder, a housing, and an anti-rotation structure. The ferrule includes a through hole that extends in a first direction and holds an optical fiber inside the through hole. The ferrule holder is disposed on the outer periphery of the ferrule and is fixed to the ferrule. The housing accommodates the ferrule and the ferrule holder therein. The anti-rotation structure is provided inside the housing and outside the ferrule, and prevents rotation of the ferrule about an axis extending in the first direction with the ferrule holder. The ferrule holder includes a tubular holder main body that accommodates the ferrule therein, and a flange part that protrudes outward from the outer periphery of the holder main body in a second direction that intersects the first direction. The flange part has a configuration to fit with the anti-rotation structure. A center of the flange part in the first direction is located in a central region of the ferrule in the first direction.

DESCRIPTION OF EMBODIMENTS

Problems to be Solved by the Present Disclosure

Figure 8:
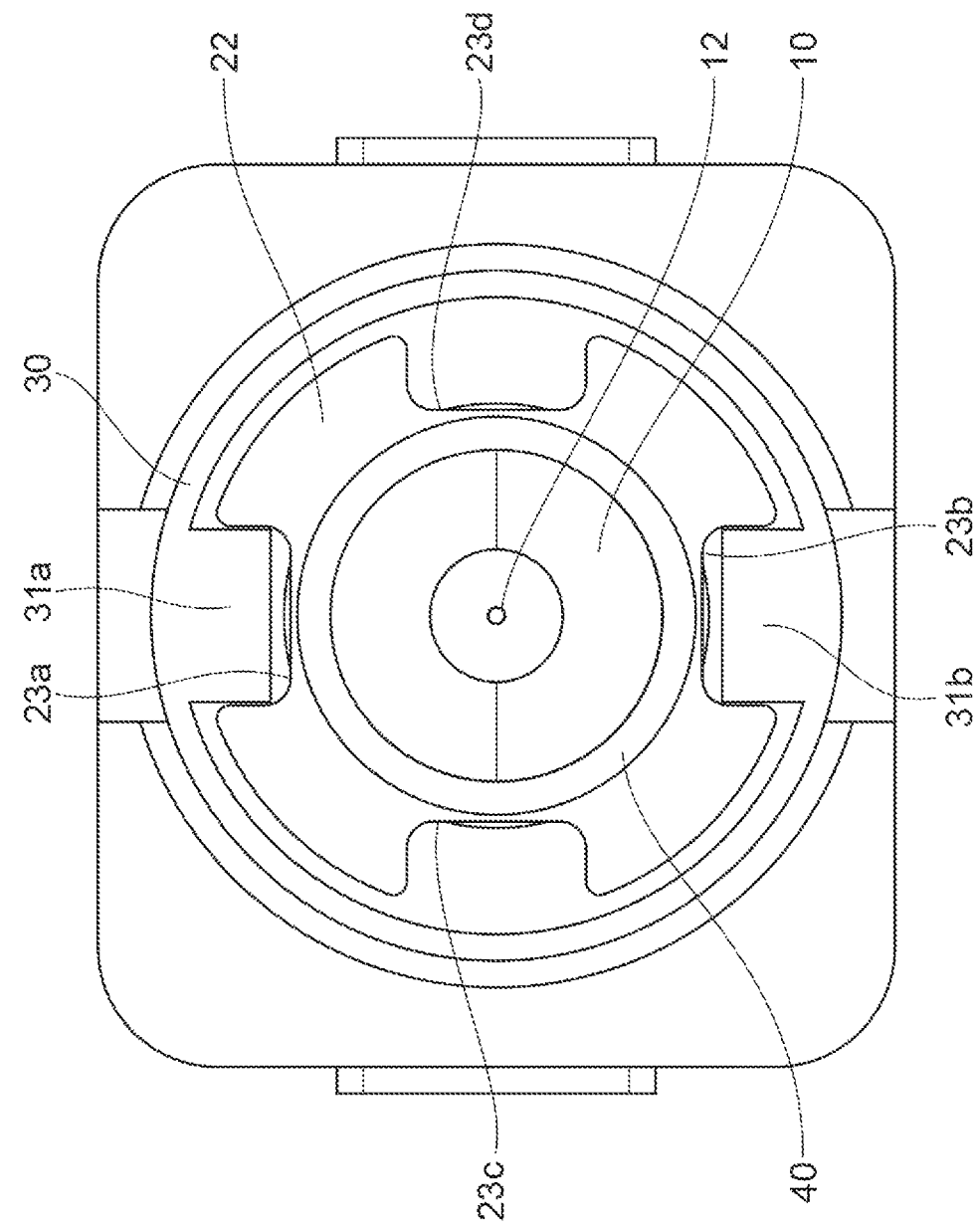
FIG. 8 is a rear view of a fitting state between the ferrule and the ferrule holder and the plug frame.

An optical connector (for example, an SC type optical connector or an LC type optical connector) is connected to one end of the plug receptacle connector disclosed in Patent Literature 1 (the left end in FIG. 8 of Patent Literature 1) or the like with a receptacle, an adapter, or the like. On the other hand, another optical connector (for example, an SC type optical connector or an LC type optical connector) is inserted into and connected to the other end of the plug receptacle connector (the right end in FIG. 8 of Patent Literature 1). At this time, both ends of the ferrule of the plug receptacle connector are optically connected to ferrules of the connected optical connectors. In the optically connected state, when the right optical connector is bent up, down, left, or right, bending stress is applied to the ferrules of the plug receptacle connector, which may cause connection loss in the optical connection between the ferrules.

Effect of the Present Disclosure

According to the present disclosure, it is possible to reduce the optical connection loss due to bending.

DESCRIPTION OF EMBODIMENTS OF THE PRESENT DISCLOSURE

First, the contents of the embodiments of the present disclosure will be listed and described. An optical connector according to one embodiment of the present disclosure includes a ferrule, a ferrule holder, a housing, and an anti-rotation structure. The ferrule includes a through hole extending in a first direction and holds an optical fiber within the through hole. The ferrule holder is disposed on the outer periphery of the ferrule and fixed to the ferrule. The housing accommodates the ferrule and the ferrule holder therein. The anti-rotation structure is provided outside the ferrule and within the housing to prevent rotation of the ferrule about an axis extending in the first direction with the ferrule holder. The ferrule holder includes a tubular holder main body that accommodates the ferrule therein, and a flange part that protrudes outward from the outer periphery of the holder main body in a second direction intersecting the first direction. The flange part has a configuration that fits with the anti-rotation structure. The center of the flange part in the first direction is located in a central region of the ferrule in the first direction.

According to the study of the inventors, in the known plug receptacle connector, a flange corresponding to the flange part is disposed near the left side of the ferrule, and it has been found that this configuration is one of factors that increase the moment of the ferrule due to bending. Thus, in the optical connector according to the embodiment of the present disclosure, in the ferrule holder that holds the ferrule, the flange part that is fixed to the optical connector (on the housing side) and serves as a fulcrum of the moment due to bending is configured to be centered to be located in the central region of the ferrule in the first direction. In this case, even when bending stress is applied to either the left or right end of the ferrule, it is possible to reduce the moment generated in the ferrule. Therefore, according to the optical connector having such a centering configuration, it is possible to reduce the optical connection loss due to bending.

As one embodiment, the central region of the ferrule may be a region within a range in which a width corresponding to 7.5% of the total length of the ferrule is expanded in each direction from the center of the ferrule to both ends of the ferrule with the center of the ferrule in the first direction as a reference. In this case, it is possible to more reliably reduce the moment generated in the ferrule and to reduce the optical connection loss due to bending.

As one embodiment, the central region of the ferrule may be a region within a range in which a width corresponding to 5% of the total length of the ferrule is expanded in each direction from the center of the ferrule to both ends of the ferrule with the center of the ferrule in the first direction as a reference. In this case, it is possible to more reliably reduce the moment generated in the ferrule and to reduce the optical connection loss due to bending.

As one embodiment, the housing may be made of a resin material having a bending elastic modulus of 10000 MPa or more. In this case, since the housing itself which mainly secures rigidity of the optical connector is less likely to deform, the influence of an external force (such as bending) on the ferrule and the like disposed inside the housing can be reduced. Therefore, according to the configuration, it is possible to reduce the bending stress itself applied to the ferrule and to reduce the optical connection loss due to bending. The bending elastic modulus is, for example, a value measured according to JIS K7171 (ISO178).

As one embodiment, a width of the flange part in the first direction may be 1 mm or less. In this case, the ferrule can be moved more freely since the width of the flange part is reduced. Thus, it is possible to further reduce the external influence on the optical connection between the ferrules, thereby reducing the optical connection loss due to bending.

As one embodiment, any of the above optical connectors may further include a split sleeve disposed adjacent to the ferrule holder in the first direction to surround the outer periphery of the end portion of the ferrule. The split sleeve may be disposed within the housing such that half of a length of the sleeve in the first direction covers the end portion of the ferrule. In this case, the optical connection between the ferrule of the optical connector and the ferrule of another optical connector connected to the optical connector can be equally protected by the split sleeve. Therefore, it is possible to protect the optical connection between the ferrules more reliably and to reduce the optical connection loss due to bending. The term "half of the length of the sleeve" as used herein does not mean 50% of the width of a split sleeve in the longitudinal direction, and has a meaning including a width deviation of ±5% or less with respect to a length that is 50% of the width of the split sleeve in the longitudinal direction.

As one embodiment, any one of the above optical connectors may further include a sleeve holder that holds the split sleeve within the housing. A gap may be provided between an outer peripheral surface of the split sleeve and an inner peripheral surface of the sleeve holder, and the gap may have a width of 0.35 mm or more in a direction orthogonal to the first direction toward the outside of the ferrule. In this case, the split sleeve that protects the optical connection between the ferrules can be moved freely within the housing to some extent. Therefore, even when bending stress is applied to the split sleeve, it is possible to continue protection of the optical connection between the ferrules by the split sleeve and to reduce the optical connection loss due to bending.

As one embodiment, the anti-rotation structure may include a pair of claw portions protruding in the second direction, and the flange part may include a pair of recessed portions that fit into the pair of claw portions. In this case, rotation of the ferrule can be prevented with a simpler configuration. In the present embodiment, the pair of claw portions and the pair of recessed portions may be provided in the vertical direction of the optical connector. The housing tends to be deformed in the vertical direction, but in this case, a gap is formed in the vertical direction between the claw portion and the recessed portion, making it easier for the ferrule to move in the vertical direction with respect to the housing. Thus, a force from the housing is less likely to be applied to the ferrule, the ferrule is less likely to bend due to deformation of the housing, and the optical connection loss due to bending can be reduced. Also, in the present embodiment, the pair of claw portions and the pair of recessed portions may be provided in the left-right direction of the optical connector. In this case, a gap between the claw portion and the recessed portion tends to be small, and it is unlikely for the ferrule to move right and left with respect to the housing. However, the housing has high rigidity in the left-right direction and is unlikely to be deformed. Therefore, even when the gap in the left-right direction is small, it is unlikely for a force to be applied to the ferrule, and thus even with such a configuration, it is possible to reduce the optical connection loss due to bending. Here, the vertical direction refers to a vertical direction when side surfaces having a longer width than the other side surfaces of the SC type optical connector are used as upper and lower surfaces, and refers to a vertical direction when a surface on which the latch is provided is the upper surface in the case of the LC type optical connector. The anti-rotation structure may have a shape complementary to a cross-sectional shape of the flange part perpendicular to the first direction.

As one embodiment, the anti-rotation structure may be a hole with a polygonal cross-section, and the flange part may have a polygonal cross-section corresponding to the cross-sectional shape of the hole of the anti-rotation structure. In this case, rotation of the ferrule can be prevented with a simpler configuration.

Details of the Embodiment of the Present Disclosure

Embodiments of the present disclosure will be described in detail below with reference to the accompanying drawings. In the following description, the same reference numerals will be used for the same elements or elements having the same functions, and redundant description will be omitted.

First Embodiment

Figure 1:
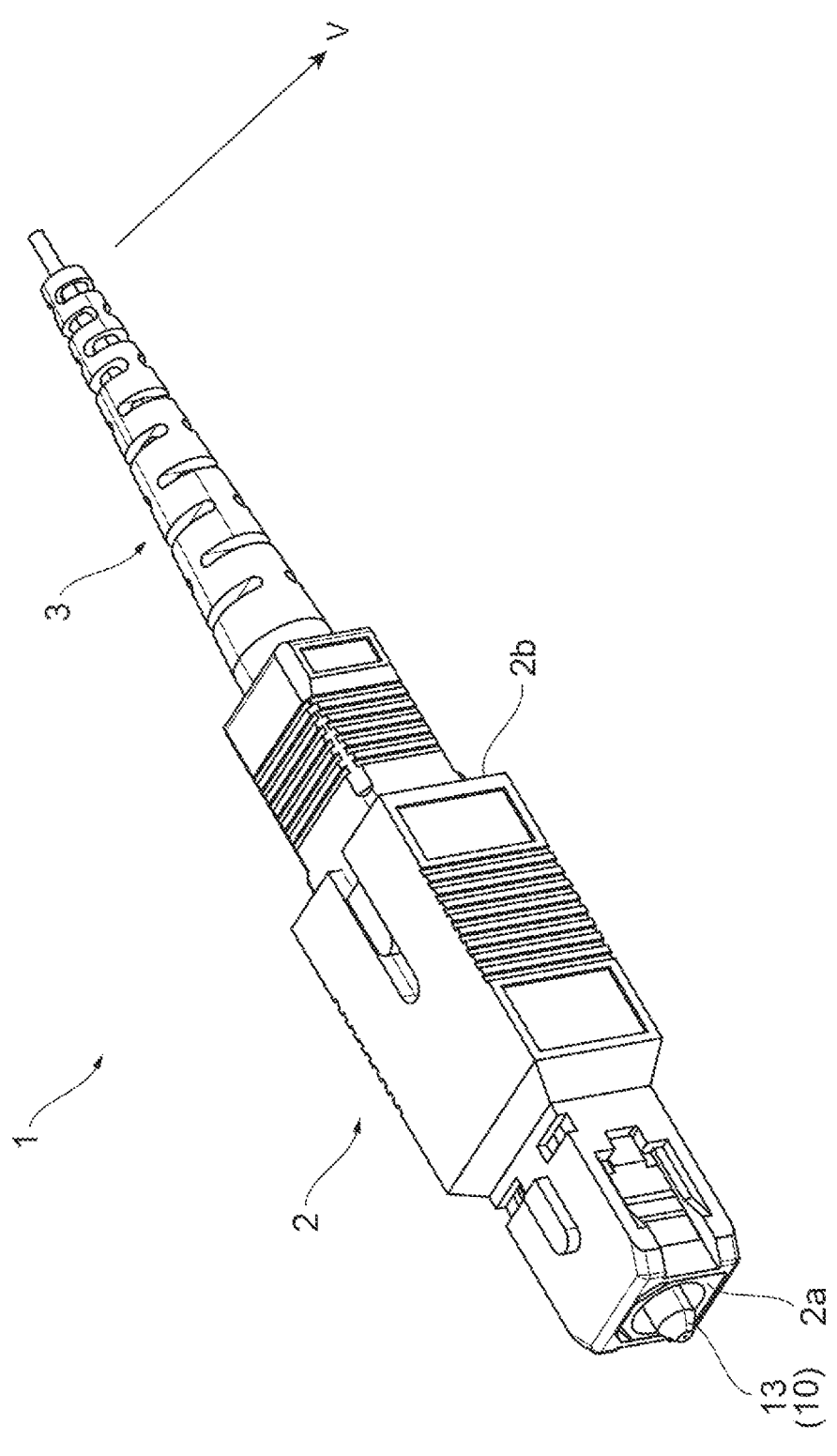
FIG. 1 is a perspective view showing an optical connection structure according to a first embodiment.
Figure 2:
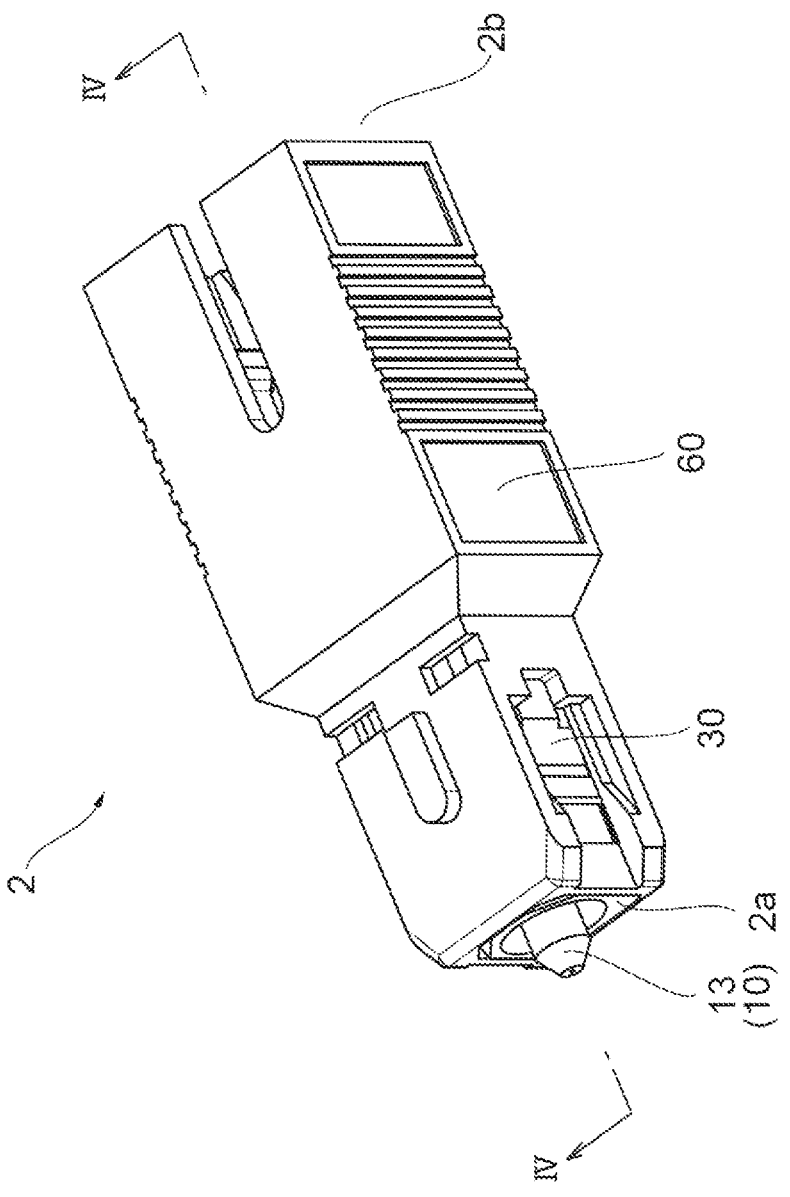
FIG. 2 is a perspective view showing a plug receptacle connector according to the first embodiment.
Figure 3:
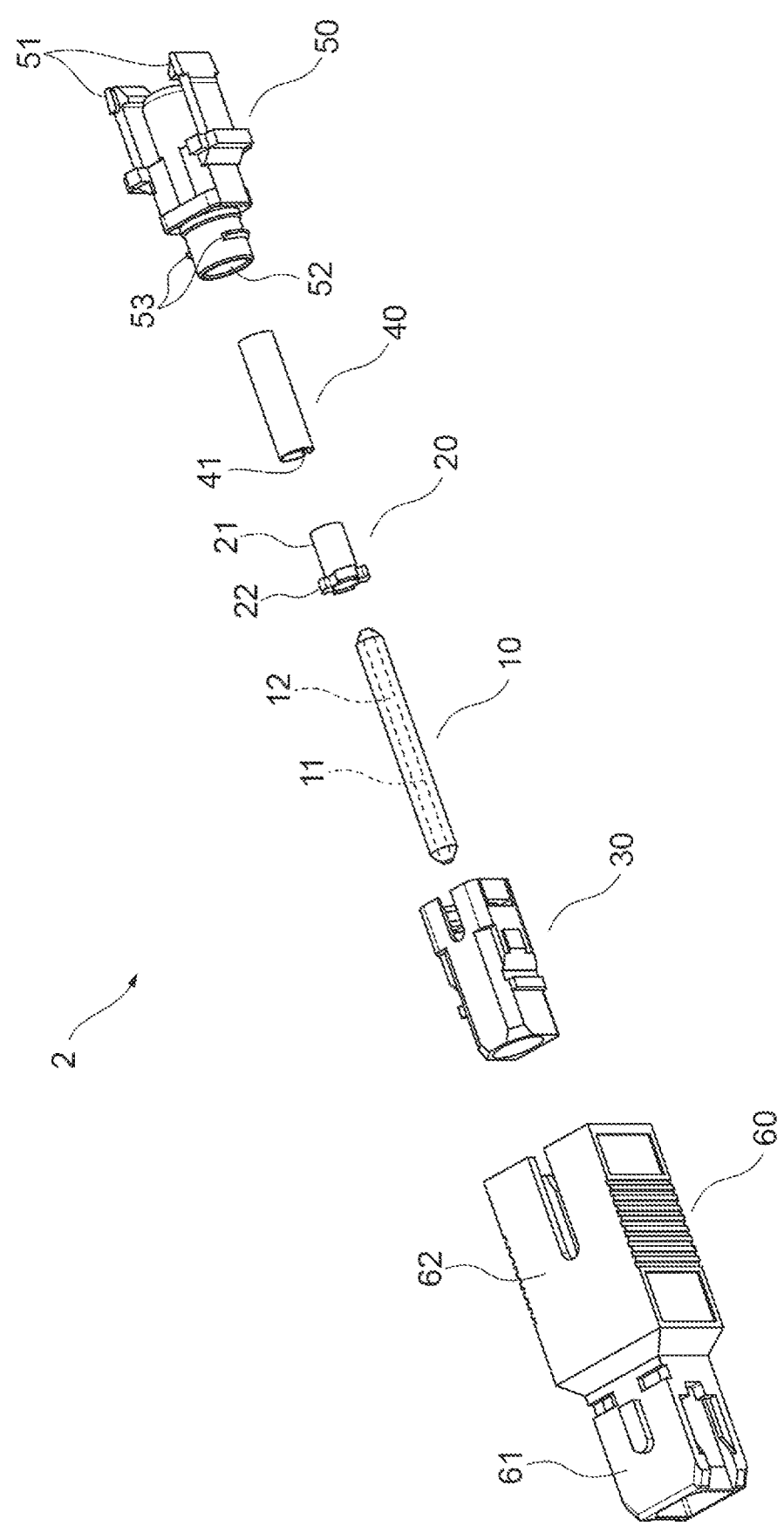
FIG. 3 is an exploded perspective view of the plug receptacle connector shown in FIG. 2.
Figure 4:
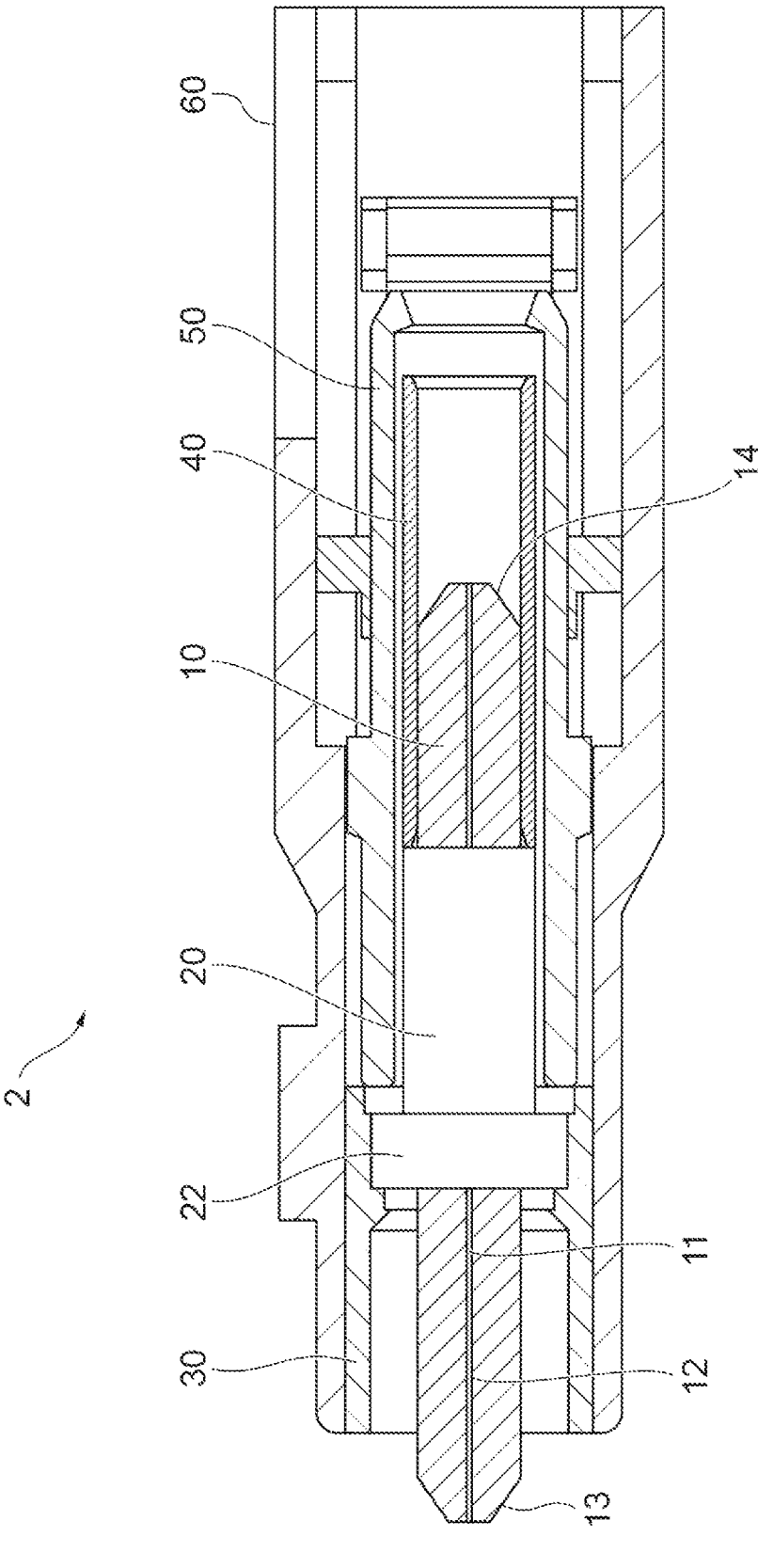
FIG. 4 is a cross-sectional view of the plug receptacle connector shown in FIG. 2 along line IV-IV.

An example of a plug receptacle connector (an optical connector) according to a first embodiment will be described with reference to FIGS. 1, 2, 3 and 4. FIG. 1 is a perspective view showing an optical connection structure in which a first optical connector (an SC type optical connector) is inserted into a plug receptacle connector. In FIG. 1, illustration of a second optical connector connected on the opposite side is omitted. FIG. 2 is a perspective view showing the plug receptacle connector. FIG. 3 is an exploded perspective view of the plug receptacle connector. FIG. 4 is a cross-sectional view of the plug receptacle connector along line IV-IV. As shown in FIG. 1, in an optical connection structure 1, a first optical connector 3 is inserted into and connected to the receptacle side 2*b* of a plug receptacle connector 2. The first optical connector 3 is, for example, an SC type optical connector. The plug receptacle connector 2 is connected to a second optical connector with a receptacle, an adapter, or the like on the plug side 2*a* opposite to the connection side of the first optical connector 3. The second optical connector may have the same configuration as the first optical connector 3.

As shown in FIGS. 2 to 4, the plug receptacle connector 2 includes a ferrule 10, a ferrule holder 20, a plug frame 30 (an anti-rotation structure), a split sleeve 40, a latch 50 (a sleeve holder) and a housing 60. For example, a light attenuation function or the like may be imparted to the optical connection structure 1 by interposing the plug receptacle connector 2 between the first optical connector 3 and the second optical connector. Other functions may be imparted to the optical connection structure 1.

Figure 5:
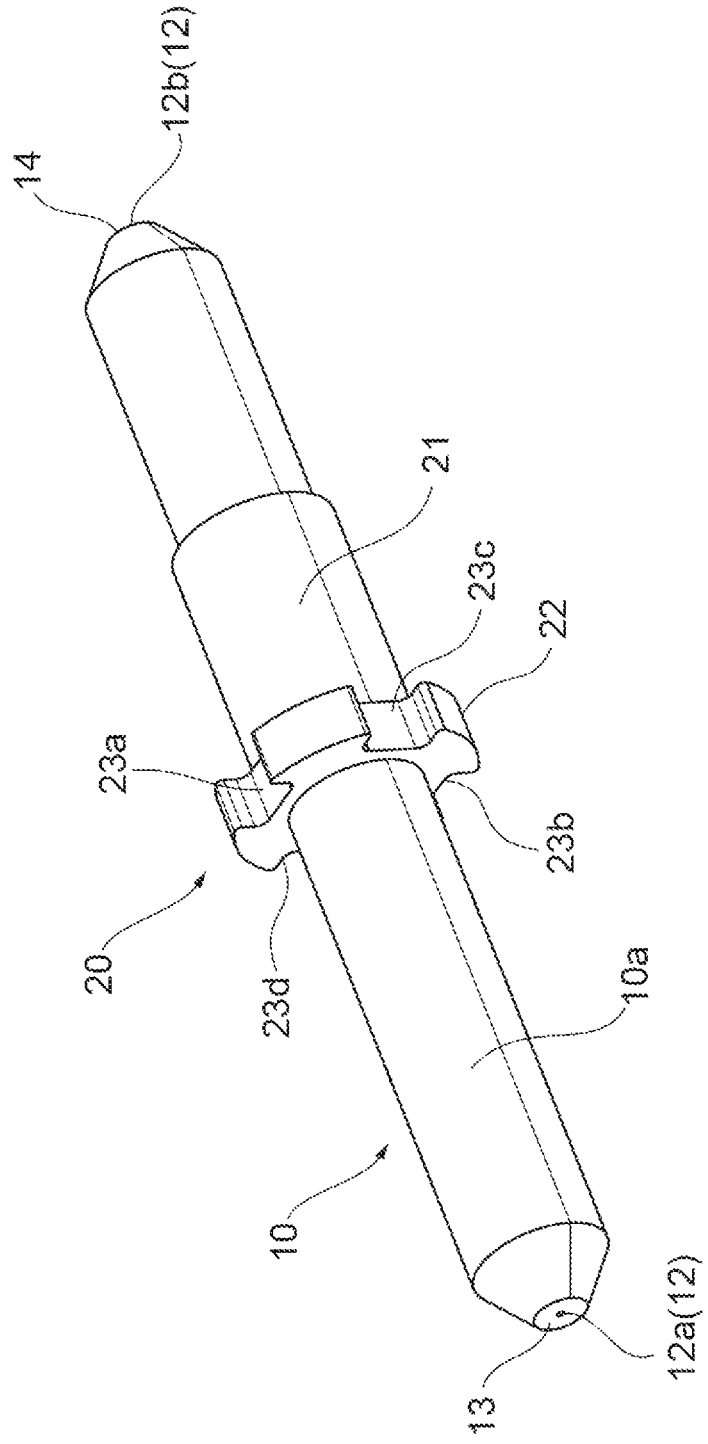
FIG. 5 is a perspective view showing a state in which a ferrule holder is coupled to a ferrule.

The ferrule 10 is a substantially cylindrical elongated member having a through hole 11 extending in a longitudinal direction (a first direction) and holds an optical fiber 12 in the through hole 11. The optical fiber 12 may be, for example, an optical fiber having an optical attenuation function, an optical fiber having another function, or an optical fiber having no specific function. The optical fiber 12 built in the ferrule 10 has both ends 12*a* and 12*b* exposed from one end 13 and the other end 14 of the ferrule 10, as shown in FIG. 5. The ferrule 10 may have a tapered shape on the one end 13 side and the other end 14 side. The ferrule 10 is optically connected to the ferrule of each of the optical connectors at each of the one end 13 and the other end 14 when each of the optical connectors is connected to the plug receptacle connector 2. The ferrule 10 is made of a ceramic material such as zirconia.

The ferrule holder 20 is, as shown in FIGS. 3 to 5, a tubular flange member made of a metal or the like. The ferrule holder 20 is disposed on an outer periphery 10*a* of the ferrule 10 and fixed to the ferrule 10. That is, the ferrule 10 and the ferrule holder 20 are integrated so as not to move relative to each other. Such integration can be performed, for example, by press-fitting the ferrule holder 20 into the ferrule 10. The ferrule holder 20 includes a tubular holder main body 21 that accommodates the ferrule 10 therein, and a flange part 22 that protrudes outward in a radial direction (a second direction) orthogonal to the longitudinal direction from an outer periphery of the holder main body 21. The flange part 22 is provided at one end (the plug side) of the holder main body 21. The ferrule holder 20 is disposed such that the flange part 22 is located at the center of the ferrule 10 in the longitudinal direction. In FIG. 4, in order to make the arrangement shape of the ferrule holder 20 easier to understand, the ferrule holder 20 is shown as it is without having a cross-sectional shape.

Figure 6:
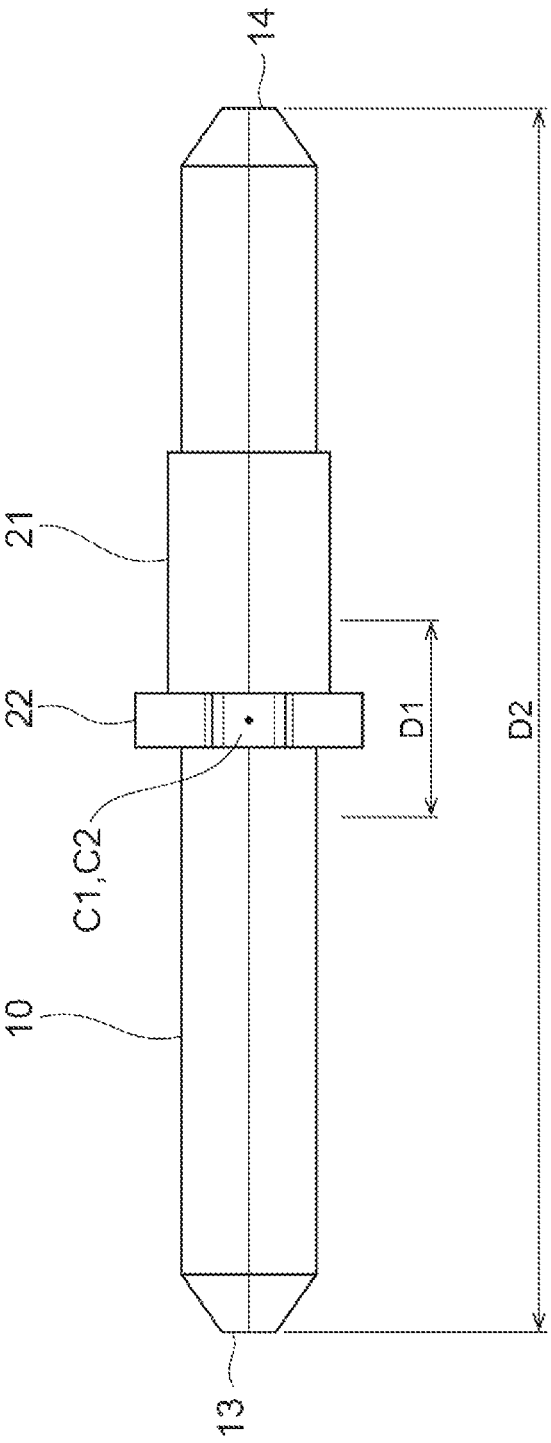
FIG. 6 is a side view showing a state in which the ferrule holder is coupled to the ferrule.

More specifically, as shown in FIG. 6, in the arrangement location of the ferrule holder 20, the ferrule holder 20 is fixed to the ferrule 10 such that a center C2 of the flange part 22 in the longitudinal direction is located within a central region D1 of the ferrule 10 in the longitudinal direction. The central region D1 may be a region within a range in which a width corresponding to 7.5% of a total length D2 of the ferrule 10 is expanded from a center C1 of the ferrule toward each of the ends 13 and 14 of the ferrule 10, for example, with the center C1 of the ferrule 10 in the longitudinal direction as a reference. The central region D1 may be a region within a range in which a width corresponding to 5% of a total length D2 of the ferrule 10 is expanded from the center C1 of the ferrule toward each of the ends 13 and 14 of the ferrule 10, for example, with the center C1 in the longitudinal direction of the ferrule 10 as a reference. The center C2 of the flange part 22 of the ferrule holder 20 may be disposed to coincide with the center C1 of the ferrule 10.

Further, as shown in FIGS. 4 and 5, the flange part 22 of the ferrule holder 20 is configured to be fitted with a plug frame 30 that serves as the anti-rotation structure. More specifically, a pair of recessed portions 23*a* and 23*b* and a pair of recessed portions 23*c* and 23*d* are provided in the flange part 22 so as to be uniform in a circumferential direction. Claw portions 31*a* and 31*b* (refer to FIGS. 7 and 8) formed inside the plug frame 30 are inserted into the recessed portions 23*a* and 23*b* on one side, and thus the ferrule 10 is prevented from rotating around a central axis with the ferrule holder 20. The claw portions 31*a* and 31*b* of the plug frame 30 may be inserted into the pair of recessed portions 23*c* and 23*d* of the flange part 22 to prevent the rotation of the ferrule 10. A width of the flange part 22 in the longitudinal direction may be 1 mm or less, 0.2 mm or more, or 0.5 mm or more.

Figure 7:
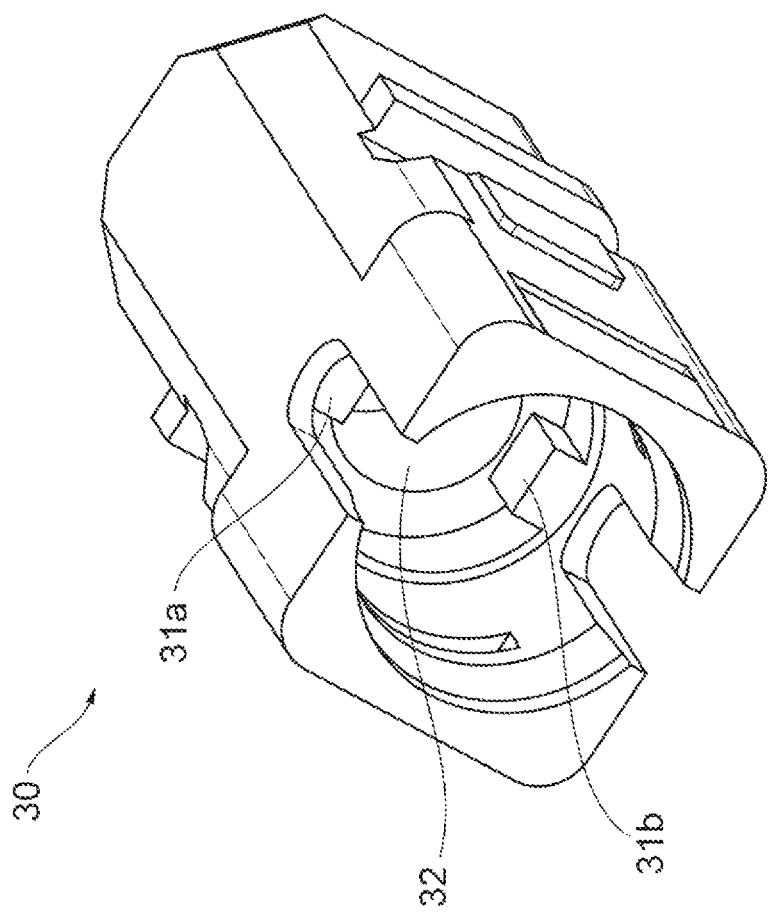
FIG. 7 is a rear perspective view of a plug frame of the plug receptacle connector shown in FIG. 2.

As shown in FIGS. 3, 4 and 7, the plug frame 30 has a substantially rectangular tubular shape and is made of, for example, a resin, or the like. FIG. 7 is a perspective view of the plug frame 30 seen from the rear (the receptacle side 2*b*). The plug frame 30 is inserted into the housing 60 and fixed to the housing 60. As described above, the plug frame 30 has the pair of claw portions 31*a* and 31*b* therein, and the pair of claw portions 31*a* and 31*b* are inserted into the recessed portions 23*a* and 23*b* of the flange part 22 of the ferrule holder 20 and are fitted thereto with a partial gap. Thus, the plug frame 30 prevents the rotation of the ferrule 10 integrated with the ferrule holder 20. That is, the plug frame 30 also serves as an anti-rotation structure. The plug frame 30 has a through hole 32 through which the ferrule 10 can pass, and one end 13 of the ferrule 10 that has passed through the through hole 32 protrudes outward from the plug frame 30 as the plug side 2*a* of the plug receptacle connector 2.

As shown in FIGS. 3 and 4, the split sleeve 40 is a tubular member having a slit 41 extending in the longitudinal direction, and performs alignment in optical connection between the ferrule 10 and the ferrule of the first optical connector 3. The split sleeve 40 is made of, for example, ceramics such as zirconia or a metal, and protects the aligned ferrules from an external impact. In the present embodiment, such a split sleeve 40 is disposed laterally adjacent to the ferrule holder 20 in the longitudinal direction on the outer periphery of the ferrule 10 on the other end 14 side. The split sleeve 40 may be disposed such that a portion that is half of a length in the longitudinal direction covers the ferrule 10 and the other half covers the ferrule of the first optical connector 3 (refer to also FIG. 14). The term "half" here does not mean 50% of the width of the split sleeve 40 in the longitudinal direction, and has a meaning including a width deviation of ±5% or less with respect to a length that is 50% of the width of the split sleeve 40 in the longitudinal direction.

As shown in FIGS. 3 and 4, the latch 50 is a member for connecting the first optical connector 3 to the plug receptacle connector 2 and has an engaging portion 51 on the rear end side. The latch 50 also serves as a sleeve holder that holds the split sleeve 40 within an inner peripheral portion 52. The latch 50 is connected to the plug frame 30 with the engaging portion 53 and accommodates the ferrule 10, the ferrule holder 20 and the split sleeve 40 in the plug frame 30 and latch 50. A gap may be provided between the outer peripheral surface of the split sleeve 40 and the inner peripheral surface of the latch 50. For example, when the center of the outer periphery of the split sleeve 40 and the center of the inner periphery of the sleeve holder coincide with each other, the gap may have a width of 0.35 mm or more in the radial direction toward the outside of the ferrule 10. That is, the split sleeve 40 may be configured to be raised with respect to the latch 50.

The housing 60 is a member that accommodates and protects the ferrule 10, the ferrule holder 20, the plug frame 30, the split sleeve 40, and the latch 50 therein. The housing 60 has a plug portion 61 on the front end side and a receptacle portion 62 on the rear end side, one end 13 of the ferrule 10 protrudes and is exposed from the tip end of the plug portion 61, and the other end 14 of the ferrule 10 is exposed inside the rear end of the receptacle portion 62. The receptacle portion 62 is formed such that a tip end portion of the first optical connector 3 is inserted therein. Such a housing 60 is made of, for example, a polybutylene terephthalate (PBT) resin, a polyetherimide (PEI) resin, a polycarbonate (PC) resin, or a polyamide (PA) resin, and may be configured to include reinforcing fibers such as glass in the resins. The housing 60 may be made of a resin material having a bending elastic modulus of 10000 MPa or more in order to further increase mechanical strength thereof. The plug frame 30 and the latch 50 may be made of a resin material similar to the material of the housing 60 described above. The bending elastic modulus is, for example, a value measured according to JIS K7171 (ISO178).

Figure 9:
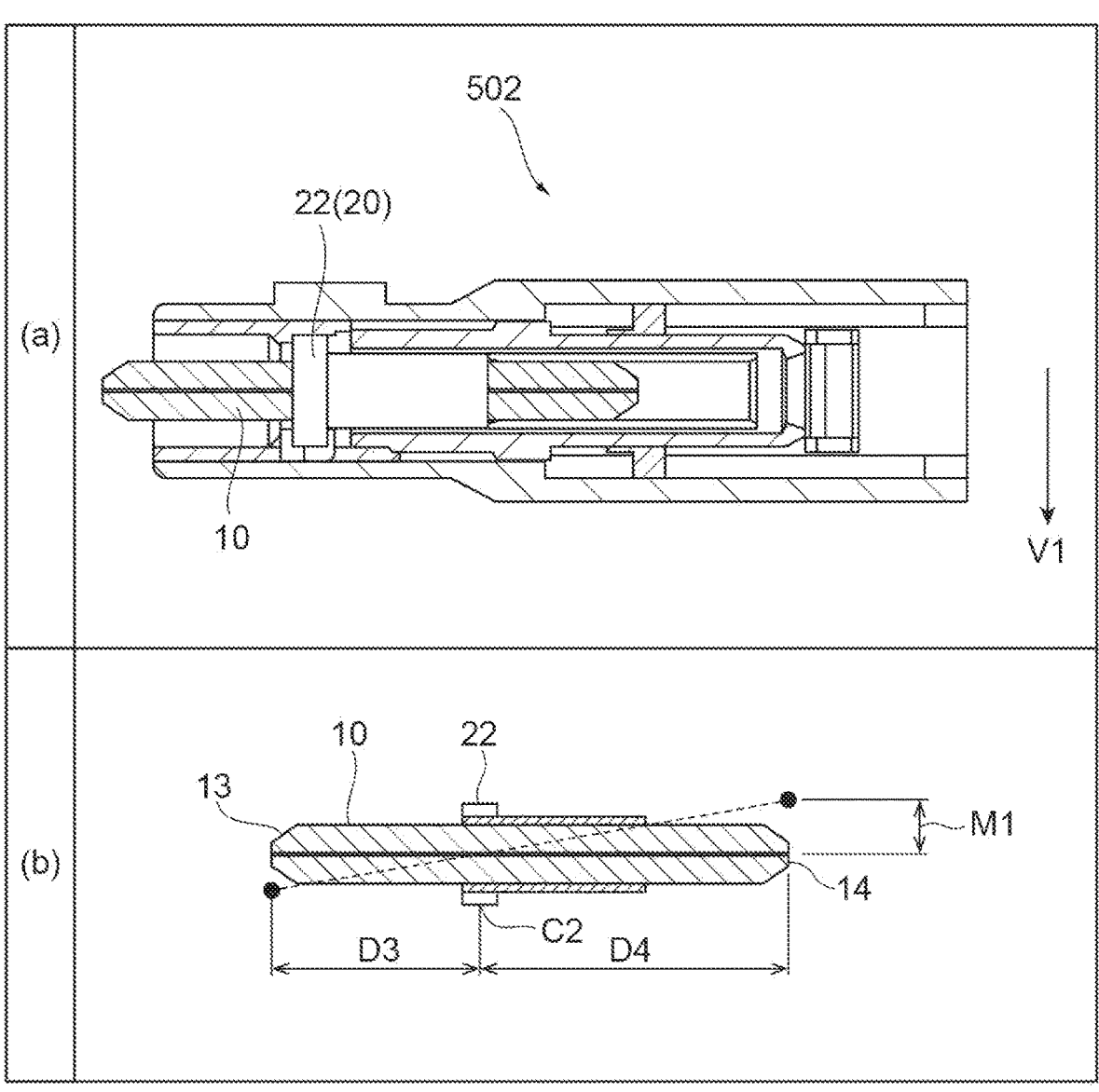
FIG. 9 is a cross-sectional view of a plug receptacle connector and a ferrule according to a comparative example.
Figure 10:
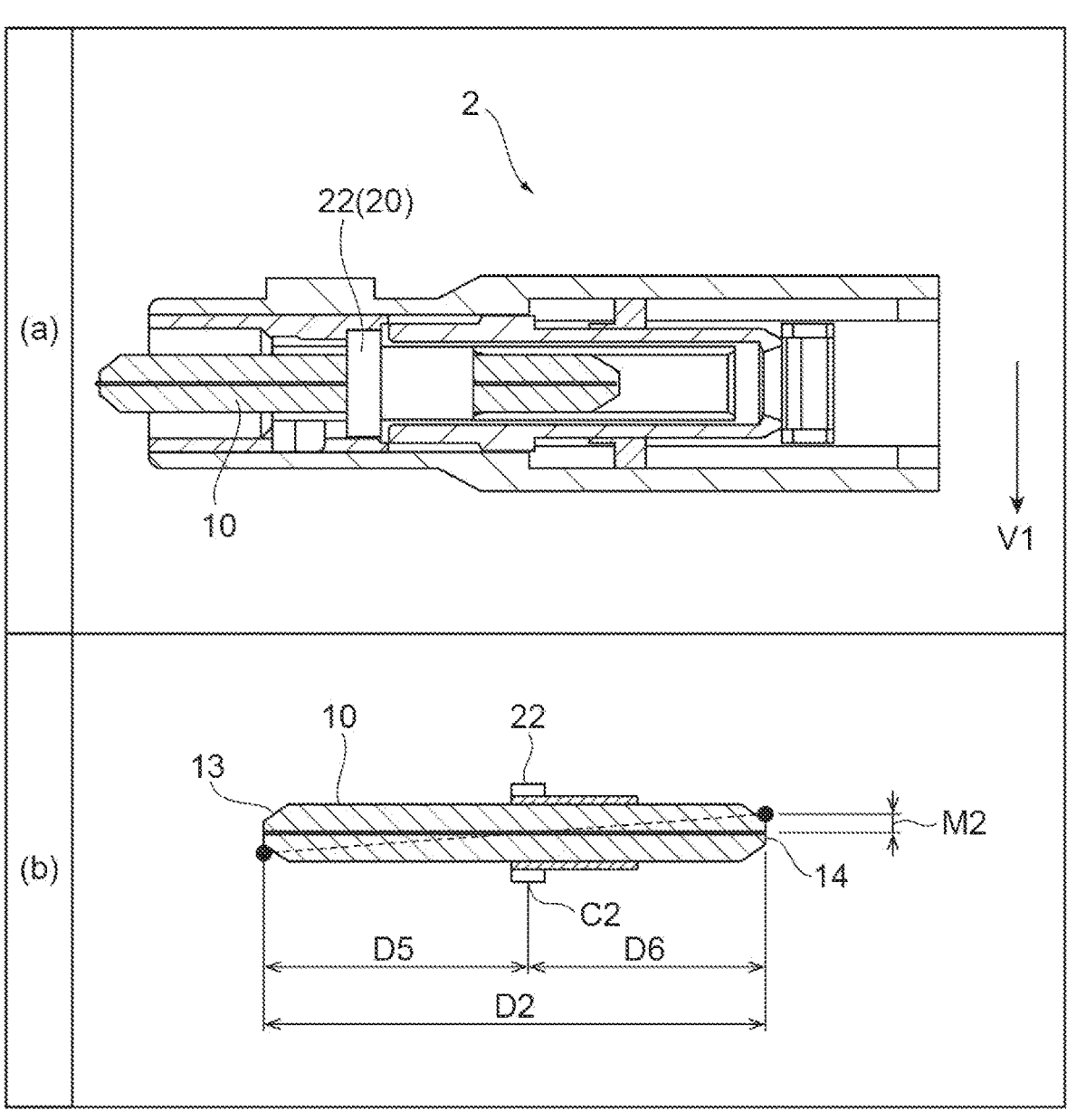
FIG. 10 is a cross-sectional view of the plug receptacle connector and the ferrule according to the first embodiment.

Here, the operations and effects of the plug receptacle connector having the centering structure described above will be described with reference to FIGS. 9 and 10. FIG. 9 is a cross-sectional view showing a configuration of a plug receptacle connector according to a comparative example, and FIG. 10 is a cross-sectional view showing a configuration of a plug receptacle connector according to the present embodiment. FIGS. 9 and 10 both show bending moments M1 and M2 in the ferrule when the bending stress of the connector is applied.

As shown in part (a) and part (b) of FIG. 9, in a plug receptacle connector 502 according to the comparative example, the flange part 22 of the ferrule holder 20 disposed on the outer periphery of the ferrule 10 is shifted to the left side (the plug side). That is, the center C2 of the flange part 22 of the ferrule holder 20 is shifted leftward away from the central region of the ferrule 10 in the longitudinal direction. Therefore, in the comparative example, a distance D4 from the flange part 22 to the other end 14 of the ferrule 10 is much larger than a distance D3 from the flange part 22 to the one end 13 of the ferrule 10 (for example, 1.5 times or more D3). When a downward bending stress V1 is applied to the plug receptacle connector 502 having such a configuration (refer to also FIG. 1), since the flange part 22 serving as a fulcrum is on the left side, the bending moment applied to the ferrule 10 becomes very large as the moment M1 on the right side (the receptacle side). That is, the ferrule 10 and the ferrule of the first optical connector 3 are likely to be misaligned.

On the other hand, in the plug receptacle connector 2 according to the present embodiment, as shown in part (a) and part (b) of FIG. 10, the flange part 22 of the ferrule holder 20 disposed on the outer periphery of the ferrule 10 is located in the central region. That is, the center C2 of the flange part 22 of the ferrule holder 20 is located in the central region (the center in the drawing) of the ferrule 10 in the longitudinal direction. When the downward bending stress V1 is applied to the plug receptacle connector 2 having such a configuration, since the flange part 22 serving as the fulcrum is located in the central region, the bending moment applied to the ferrule 10 on the right side (receptacle side) can be smaller than the moment M1 as indicated by the moment M2. Since it is centered, the same small moment M2 can be applied to the left side (the plug side) of the plug receptacle connector 2 as well. That is, the misalignment between the ferrule 10 and the ferrule of the first optical connector 3 can be reduced.

Thus, in the plug receptacle connector 2 according to the present embodiment, in the ferrule holder 20 that holds the ferrule 10, the flange part 22 that is fixed to the plug receptacle connector 2 (on the housing 60 side) and serves as a fulcrum of moment due to bending stress is configured to be centered so as to be located in the central region D1 in the longitudinal direction of the ferrule 10. Therefore, even when bending stress is applied to either one of the left and right ends 13 and 14 of the ferrule 10, the moment generated in the ferrule 10 can be reduced. Therefore, according to the plug receptacle connector having such a centering configuration, the optical connection loss due to bending can be reduced. For example, when a load of 500 g was applied as bending stress to the plug receptacle connector 502 having the configuration shown in FIG. 9, the optical loss was 5.0 dB when an optical signal with a wavelength of 1310 nm was transmitted. On the other hand, when a load of 500 g was applied as bending stress to the plug receptacle connector 2 shown in FIG. 10, the optical loss was reduced to 2.0 dB when an optical signal with a wavelength of 1310 nm was transmitted.

Further, in the plug receptacle connector 2 according to the present embodiment, the housing 60 may be made of a resin material having a bending elastic modulus of 10000 MPa or more. In this case, since the housing itself which mainly ensures the rigidity of the plug receptacle connector is less likely to deform, the influence of an external force (bending, or the like) on the ferrule 10 and the like disposed inside the housing can be reduced. Therefore, according to such a configuration, it is possible to reduce the bending stress itself applied to the ferrule 10 and to reduce the optical connection loss due to bending. For example, when a material with a bending elastic modulus of 10000 MPa or more is used as the material of the housing 60, compared to a case in which the bending elastic modulus is lower than 10000 MPa (for example, when a material with a bending elastic modulus of 5400 MPa is used), the optical loss can be curbed to about ½.

Further, in the plug receptacle connector 2 according to the present embodiment, a width of the flange part 22 in the longitudinal direction may be 1 mm or less. In this case, since the width of the flange part 22 is reduced, the movement of the ferrule 10 within the housing 60 can be made more freely. Thus, it is possible to further reduce the external influence on the optical connection between the ferrules, thereby reducing the optical connection loss due to bending.

Further, the plug receptacle connector 2 according to the present embodiment further includes the split sleeve 40 that surrounds the outer periphery of the end portion of the ferrule 10 and is disposed adjacent to the ferrule holder 20 in the longitudinal direction. The split sleeve 40 may be disposed within the housing 60 such that half of a length of the sleeve in the longitudinal direction covers the end portion of the ferrule 10. In this case, the optical connection between the ferrule 10 of the plug receptacle connector 2 and the ferrule of the first optical connector 3 can be uniformly held by the split sleeve 40. Therefore, the optical connection between the ferrules can be more reliably protected, and the optical connection loss due to bending can be reduced.

The plug receptacle connector 2 according to the present embodiment further includes the latch 50 that holds the split sleeve 40 inside the housing 60, and a gap may be provided between the outer peripheral surface of the split sleeve 40 and the inner peripheral surface of the latch 50 that is the sleeve holder. For example, when the center of the outer periphery of the split sleeve 40 and the center of the inner periphery of the latch 50 as the sleeve holder coincide with each other, the gap may have a width of 0.35 mm or more in the radial direction toward the outside of the ferrule 10. In this case, the split sleeve 40 that protects the optical connection between the ferrules can be moved freely within the housing 60 to some extent. Therefore, even when bending stress is applied to the split sleeve 40, it is possible to continue protection of the optical connection between the ferrules by the split sleeve 40 and to reduce the optical connection loss due to bending.

Further, in the plug receptacle connector 2 according to the present embodiment, the plug frame 30 which is the anti-rotation structure has the pair of claw portions 31a and 31b (complementary shapes) protruding in the second direction, and the flange part 22 has the pair of recessed portions 23a and 23b that fit onto the pair of claw portions 31a and 31b. Here, the complementary shapes mean shapes that complement each other, for example, when one structure is protruding and the other structure is recessed, and may be other shapes as long as they complement each other. As a result, rotation of the ferrule 10 can be prevented with a simple configuration. In the present embodiment, the pair of claw portions 31a and 31b and the pair of recessed portions 23a and 23b may be provided in the vertical direction of the plug receptacle connector 2. The housing 60 tends to be deformed in the vertical direction, but in this configuration, gaps are formed in the vertical direction between the claw portions 31a and 31b and the recessed portions 23a and 23b, and thus the ferrule 10 can easily move in the vertical direction with respect to the housing 60. Thus, a force from the housing 60 is less likely to be applied to the ferrule 10, bending or the like of the ferrule 10 is less likely to occur due to deformation of the housing 60, and thus it is possible to reduce the optical connection loss due to the bending. The pair of claw portions 31a and 31b and the pair of recessed portions 23a and 23b may be provided in the left-right direction of the plug receptacle connector 2. In this case, the gaps between the claw portions 31a and 31b and the recessed portions 23c and 23d tend to become smaller, and thus it is unlikely for the ferrule 10 to move left and right with respect to the housing 60. However, the housing 60 has high rigidity in the left-right direction and is unlikely to be deformed. Therefore, even though the gap in the left-right direction is small, it is unlikely for a force to be applied to the ferrule 10, and thus even with such a configuration, it is possible to reduce the optical connection loss due to bending. Here, the vertical direction is a vertical direction when side surfaces having a longer width than the other side surfaces are used as upper and lower surfaces in the SC type optical connector.

Second Embodiment

Figure 11:
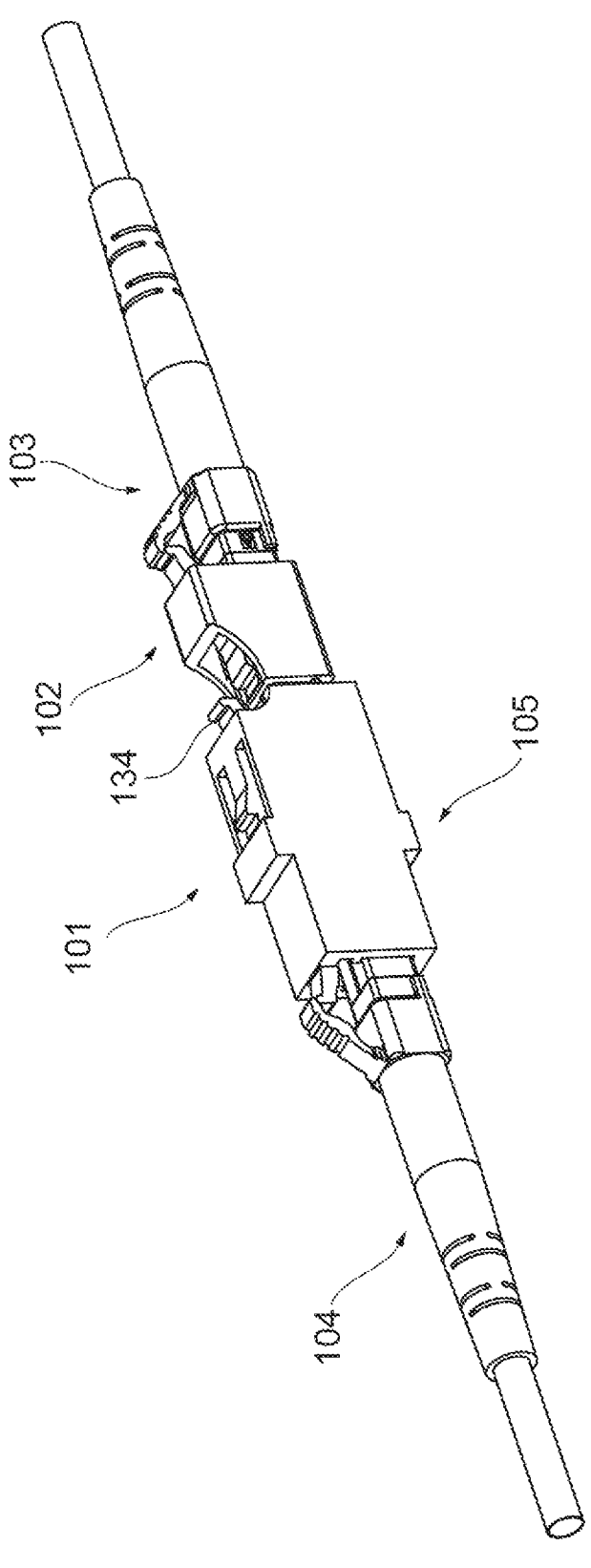
FIG. 11 is a perspective view showing an optical connection structure according to a second embodiment.
Figure 12:
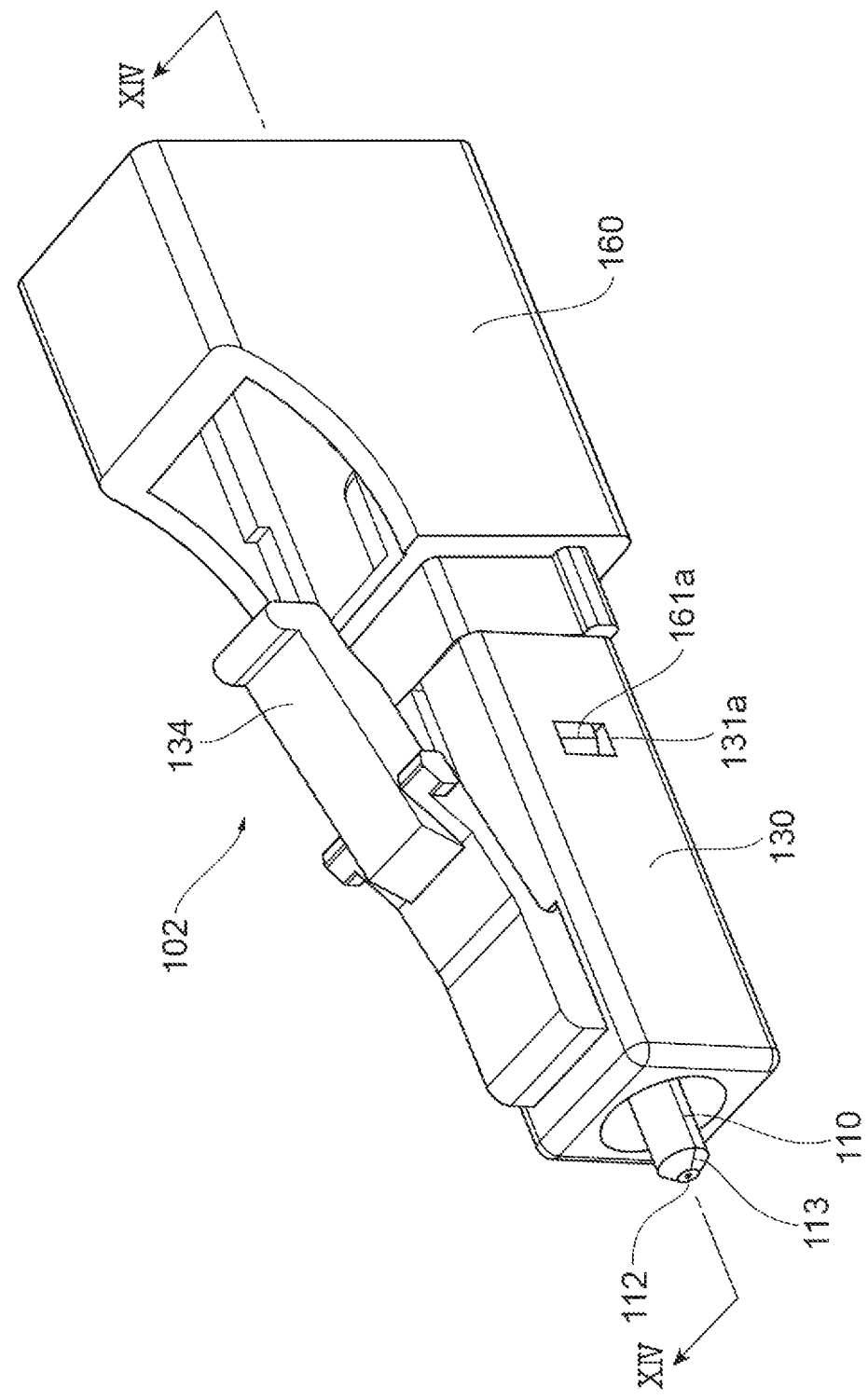
FIG. 12 is a perspective view showing a plug receptacle connector according to the second embodiment.
Figure 13:
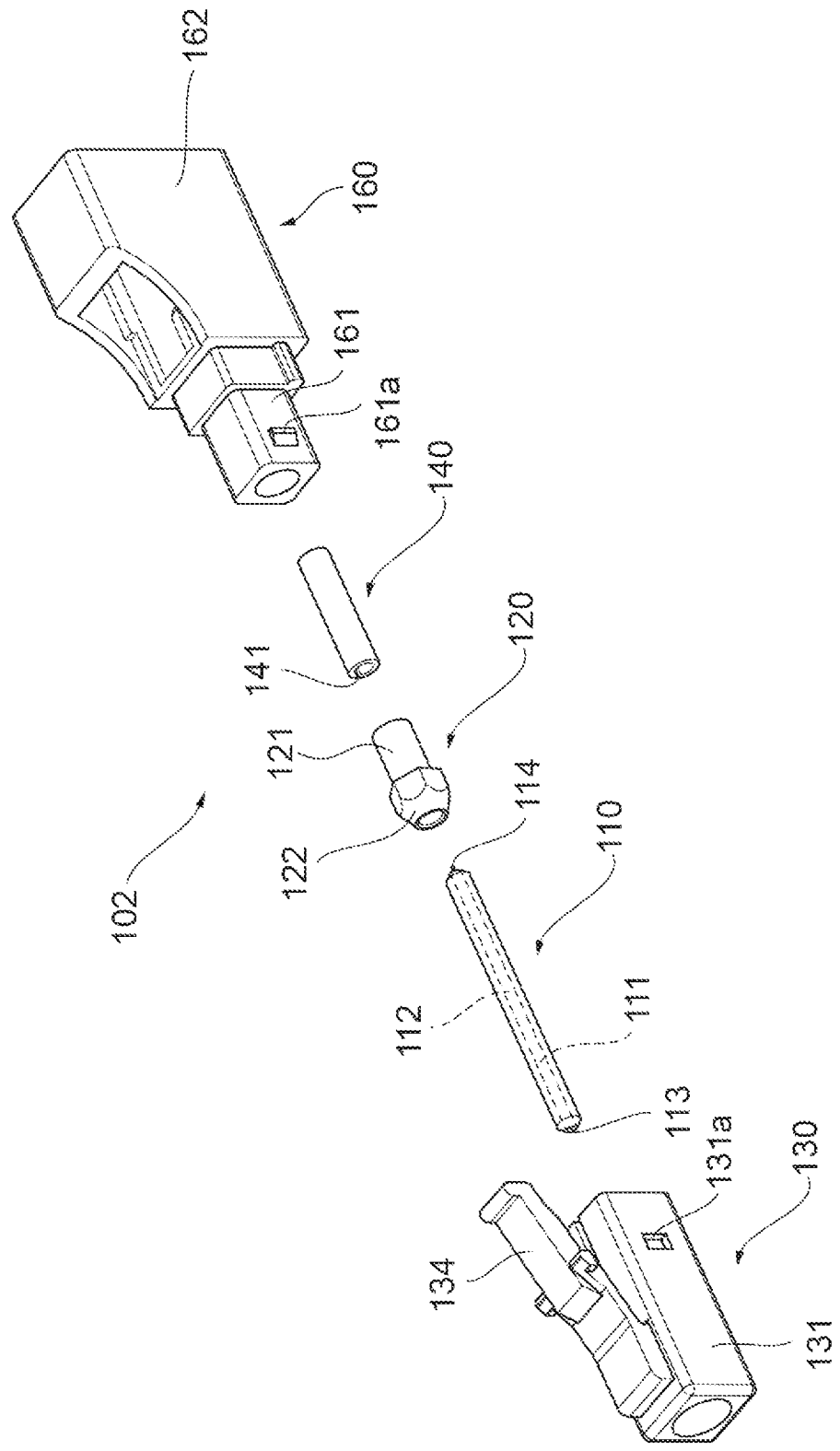
FIG. 13 is an exploded perspective view of the plug receptacle connector shown in FIG. 12.
Figure 14:
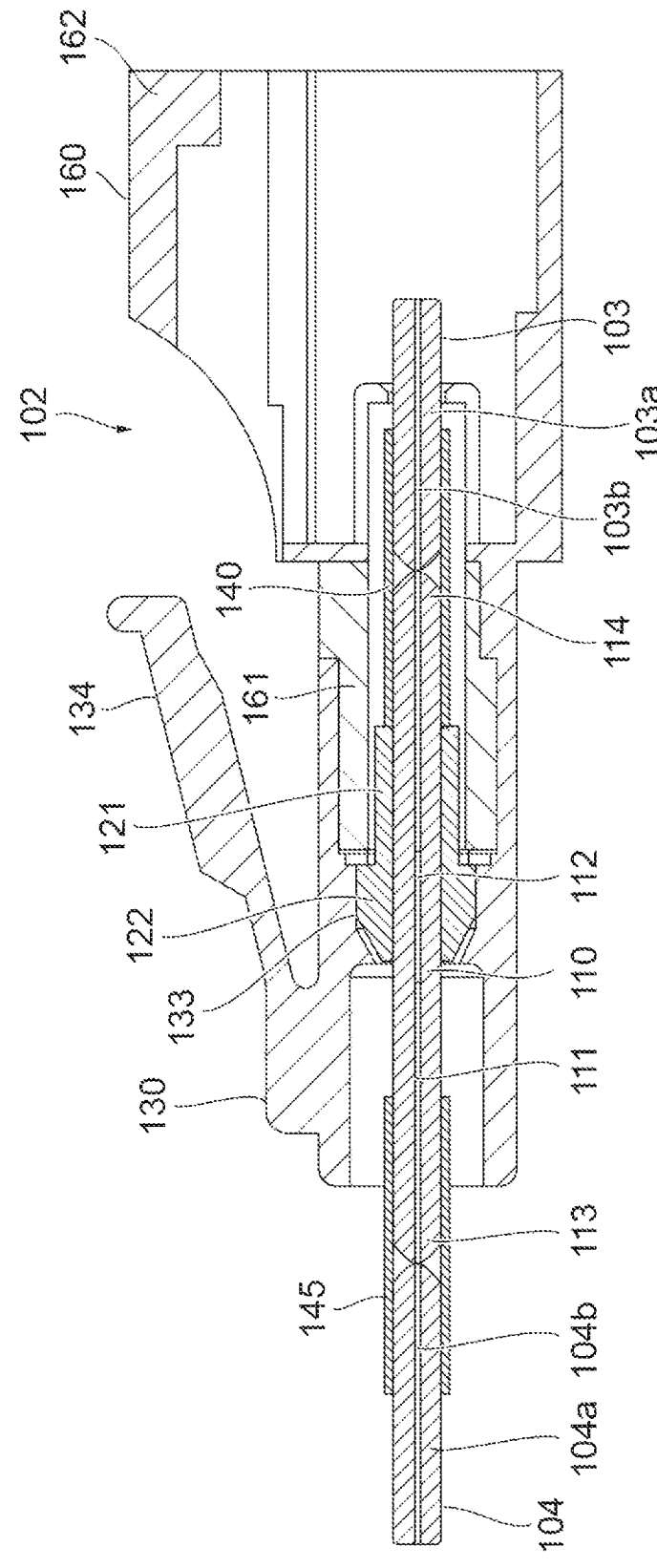
FIG. 14 is a cross-sectional view of the plug receptacle connector shown in FIG. 12 along line XIV-XIV.

Next, a plug receptacle connector according to a second embodiment of the present disclosure will be described with reference to FIGS. 11, 12, 13 and 14. FIG. 11 is a perspective view showing an optical connection structure in which first and second optical connectors (both LC type optical connectors) are optically connected to the plug receptacle connector according to the second embodiment. FIG. 12 is a perspective view showing the plug receptacle connector according to the second embodiment. FIG. 13 is an exploded perspective view of the plug receptacle connector according to the second embodiment. FIG. 14 is a cross-sectional view of the plug receptacle connector according to the second embodiment. As shown in FIG. 11, in the optical connection structure 101, on the plug side of the plug receptacle connector 102 according to the second embodiment, a second optical connector 104 is inserted and connected with an adapter 105 or another receptacle or the like. The plug receptacle connector 102 is connected to a first optical connector 103 on the receptacle side opposite to the connection side of the second optical connector 104. The first optical connector 103 and the second optical connector 104 are, for example, LC type optical connectors.

As shown in FIGS. 12 to 14, the plug receptacle connector 102 includes a ferrule 110, a ferrule holder 120, a plug frame 130 (an anti-rotation structure), a split sleeve 140 and a receptacle frame 160 (a sleeve holder). The plug frame 130 and the receptacle frame 160 constitute the housing of the plug receptacle connector 102. For example, a light attenuation function can be provided to the optical connection structure 101 by interposing the plug receptacle connector 102 between the first optical connector 103 and the second optical connector 104. Another function may be provided to the optical connection structure 101, or a specific function may not be provided thereto.

Like the ferrule 10 of the first embodiment, the ferrule 110 is a substantially cylindrical elongated member having a through hole 111 extending in the longitudinal direction and holds an optical fiber 112 in the through hole 111. Both ends of the optical fiber 112 built in the ferrule 110 are exposed from one end 113 and the other end 114 of the ferrule 110. When the first optical connector 103 and the second optical connector 104 are connected to the plug receptacle connector 102, the ends 113 and 114 of the ferrule 110 are optically connected to ferrules 103a and 104a (built-in optical fibers 103b and 104b) of the first and second optical connectors 103 and 104, respectively.

Like the ferrule holder 20 of the first embodiment, the ferrule holder 120 is a tubular flange member and is disposed on the outer periphery of the ferrule 110 and fixed to the ferrule 110. The ferrule holder 120 includes a tubular holder main body 121 that accommodates the ferrule 110 therein, and a flange part 122 that protrudes outward from the outer periphery of the holder main body 121 in the radial direction. The ferrule holder 120 is disposed such that the flange part 122 is located substantially at the center of the ferrule 110 in the longitudinal direction, as in the first embodiment.

That is, in the arrangement location of the ferrule holder 120, the ferrule holder 120 is fixed to the ferrule 110 such that the center of the flange part 122 in the longitudinal direction is located in a central region of the ferrule 110 in the longitudinal direction (refer to FIG. 6). As in the first embodiment, for example, this central region may be a region within a range in which a width corresponding to 5% or 7.5% of the total length of the ferrule 110 is expanded from the center of the ferrule 110 to each of the ends 113 and 114 of the ferrule 110 with the center of the ferrule 110 in the longitudinal direction as a reference. In the plug receptacle connector 102 according to the second embodiment, the ferrule holder 120 may be disposed such that the center of the flange part 122 of the ferrule holder 120 coincides with the center of the ferrule 110.

The flange part 122 of the ferrule holder 120 has a structure that fits with the anti-rotation structure, like the flange part 22 of the first embodiment. However, the flange part 122 has a shape different from that of the flange part 22 of the first embodiment, has a hexagonal cross-sectional shape (a polygonal cross section), and has a tapered shape in which an outer diameter thereof becomes narrower toward the front (refer to also FIG. 17). As will be described below, the plug frame 130 has a hexagonal inner hole 133 (refer to FIG. 15, the anti-rotation structure) corresponding to the flange part 122, and is prevented from rotating around the center axis of the ferrule 110 with the ferrule holder 120 by inserting and fitting the flange part 122 of the ferrule holder 120 into the inner hole 133 from the rear. The flange part 122 of the ferrule holder 120 may have another polygonal cross-sectional shape, non-axisymmetric cross-sectional shape, or other shape as long as it exhibits an anti-rotation function. The flange part 122 can be easily inserted into the inner hole 133 of the plug frame 130 due to the tapered tip end thereof. A width of the flange part 122 in the longitudinal direction may be 1 mm or less, 0.2 mm or more, or 0.5 mm or more, as in the first embodiment. The center of the flange part 122 in the longitudinal direction in the second embodiment is a center of a portion corresponding to the anti-rotation structure, and means a center of a portion in the longitudinal direction having the hexagonal cross-sectional shape excluding the tapered portion.

Figure 15:
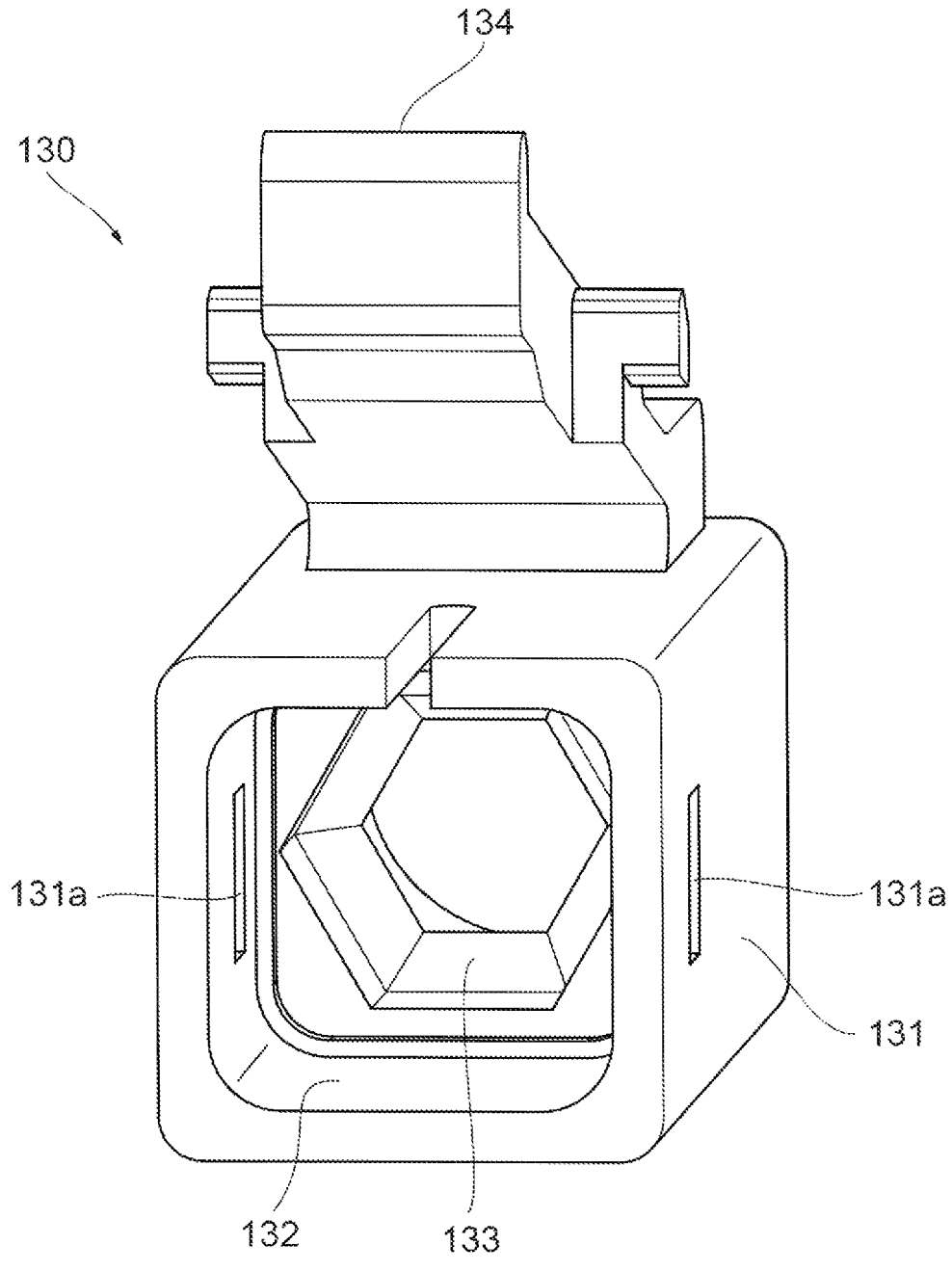
FIG. 15 is a rear perspective view of a plug frame of the plug receptacle connector shown in FIG. 12.

As shown in FIGS. 13 and 15, the plug frame 130 includes a housing main body 131 having a substantially rectangular tubular shape and is made of, for example, a resin. The plug frame 130 is a member having the function of the plug frame 30 in the first embodiment. The plug frame 130 is fixed to the receptacle frame 160 with a front end portion 161 of the receptacle frame 160 accommodated in an inner peripheral portion 132. This fixation is performed, for example, by engaging a pair of protrusions 161a provided on both side surfaces of the front end portion 161 with through holes 131a provided on both side surfaces of the plug frame 130. As described above, the plug frame 130 includes the inner hole 133 having a hexagonal cross-sectional shape in the inner peripheral portion 132, and the flange part 122 of the ferrule holder 120 is inserted and fixed into the inner hole 133. Thus, the plug frame 130 prevents rotation of the ferrule 110. That is, the plug frame 130 serves as an anti-rotation structure. The cross-sectional shape of the inner hole 133 of the plug frame 130 is not limited to a hexagon, may be another polygonal shape or non-axisymmetric cross-sectional shape as long as it can prevent the rotation of the flange part 122, may be a shape complementary to the cross-sectional shape of the flange part 122, that is, a shape that complements each other, and may have at least one corner portion. The inner peripheral portion 132 of the plug frame 130 penetrates from the rear end to the tip end side via the inner hole 133, and one end 113 of the ferrule 110 protrudes from the tip end of the plug frame 130 and is exposed.

A latch 134 is formed on the upper surface of the plug frame 130. As shown in FIG. 11, when plug receptacle connector 102 is inserted into an adapter 105, the plug receptacle connector 102 is locked to the adapter 105 by the latch 134. The one end 113 of the ferrule 110 of the plug receptacle connector 102 locked to the adapter 105 is optically connected to the second optical connector 104 (the ferrule 104a) inserted and locked into the adapter 105 in an opposite direction. A split sleeve 145 may be used for the optical connection (refer to FIG. 14).

Figure 17:
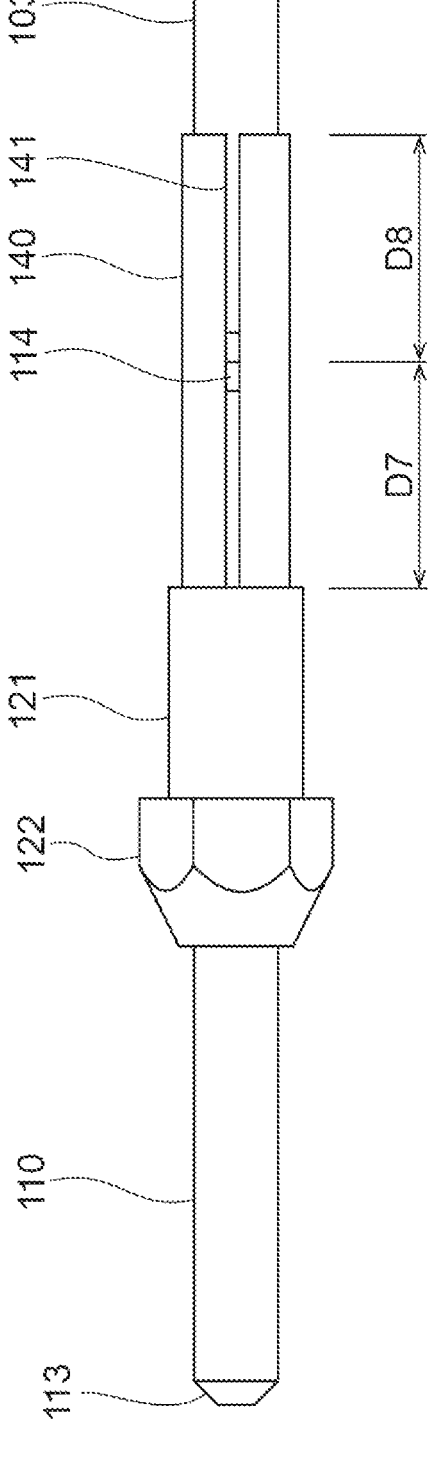
FIG. 17 is a side view showing a positional relationship between a split sleeve and each of the ferrules.

The split sleeve 140 is a tubular member having a slit 141 extending in the longitudinal direction and performs alignment in the optical connection between the ferrule 110 and the ferrule 103a of the first optical connector 103. The split sleeve 140 is made of, for example, ceramics such as zirconia or a metal, and protects the aligned ferrules from an external impact. In the present embodiment, such a split sleeve 140 is disposed adjacent to the ferrule holder 120 in the longitudinal direction on the outer periphery of the ferrule 110 on the other end 114 side. As shown in FIG. 17, the split sleeve 140 may be disposed such that a portion D7 that is half of a length in the longitudinal direction covers the ferrule 110 and a portion D8 that is the other half of the length covers the ferrule 103a of the first optical connector 103. The term "half" here does not mean just 50% of the width of the split sleeve 140 in the longitudinal direction, and has a meaning including a width deviation of ±5% or less with respect to a length that is 50% of the width of the split sleeve 140 in the longitudinal direction.

Figure 16:
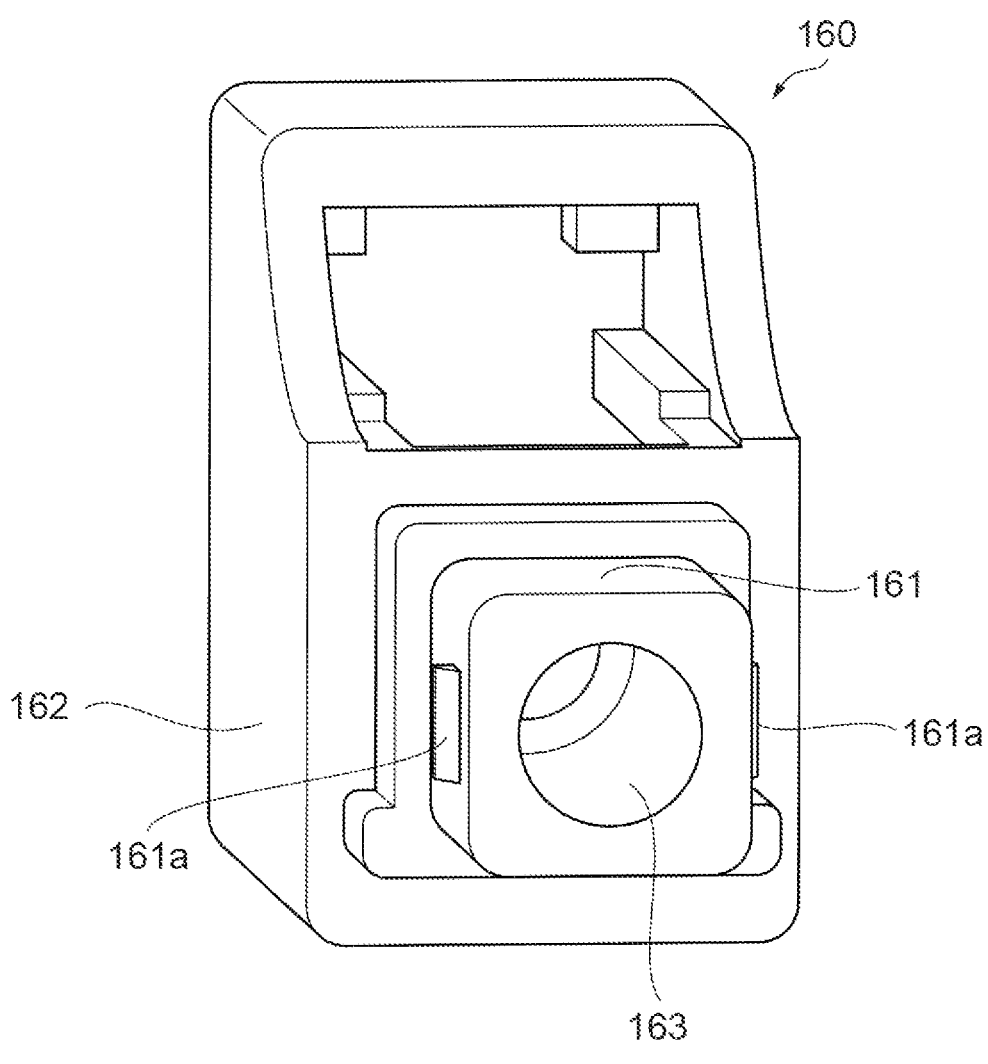
FIG. 16 is a front perspective view of a receptacle frame of the plug receptacle connector shown in FIG. 12.

The receptacle frame 160 is a member that accommodates and protects the ferrule 110, the ferrule holder 120 and the split sleeve 140 together with the plug frame 130 therein. The receptacle frame 160 includes a front end portion 161 and a rear end portion 162. As shown in FIG. 16, the front end portion 161 has an inner hole 163 and also serves as a sleeve holder that holds the split sleeve 140 within the front end portion 161. The rear end portion 162 is configured such that other end 114 of the ferrule 110 is exposed inside the rear end. The rear end portion 162 is formed such that the tip end portion (the ferrule 103a) of the first optical connector 103 is inserted from the rear side. Such a receptacle frame 160 is made of, for example, a polybutylene terephthalate (PBT) resin, a polyetherimide (PEI) resin, a polycarbonate (PC) resin, or a polyamide (PA) resin, and may be configured by including reinforcing fibers such as glass in the resins. The receptacle frame 160 may be made of a resin material having a bending elastic modulus of 10000 MPa or more in order to increase mechanical strength thereof. The plug frame 130 may be made of the resin material described above.

Also, the receptacle frame 160 is connected to the plug frame 130 with an engaging portion and accommodates the ferrule 110, the ferrule holder 120 and the split sleeve 140 in the plug frame 130 and the receptacle frame 160. A gap may be provided between the outer peripheral surface of the split sleeve 140 and the inner peripheral surface of the front end portion 161 of the receptacle frame 160, as in the first embodiment. For example, the gap when the center of the outer periphery of the split sleeve 140 and the center of the inner periphery of the inner hole 163 that is the sleeve holder coincide with each other may have a width of 0.35 mm or more in the radial direction toward the outside of the ferrule

13

14

110. That is, also in the second embodiment, the split sleeve 140 may be configured to be raised with respect to the receptacle frame 160.

As described above, in the plug receptacle connector 102 according to the present embodiment, as in the first embodiment, the flange part 122 that is fixed to the plug receptacle connector 102 (on the plug frame 130 side) in the ferrule holder 120 that holds the ferrule 110 and serves as a fulcrum for a moment due to bending is configured to be centered so as to be located in the central region of the ferrule 110 in the longitudinal direction. Thus, even when bending stress is applied to either one of the left and right ends 113 and 114 of the ferrule 110, the moment generated in the ferrule 110 can be reduced. Therefore, according to the plug receptacle connector 102 having such a centering configuration, the optical connection loss due to bending can be reduced.

Further, in the plug receptacle connector 102 according to the present embodiment, the plug frame 130 and the receptacle frame 160 may be made of a resin material having a bending elastic modulus of 10000 MPa or more. In this case, since the housing itself which mainly ensures the rigidity of the plug receptacle connector is less likely to be deformed, the influence of an external force (bending, or the like) on the ferrule 110 and the like disposed inside the housing can be reduced. Therefore, according to such a configuration, it is possible to reduce the bending stress itself applied to the ferrule 110 and to reduce the optical connection loss due to bending.

Further, in the plug receptacle connector 102 according to the present embodiment, a width of the flange part 122 in the longitudinal direction may be 1 mm or less. In this case, since the width of the flange part 122 is reduced, the movement of the ferrule 110 within the housing can be made more freely. Thus, it is possible to further reduce the external influence on the optical connection between the ferrules, thereby reducing the optical connection loss due to bending.

The plug receptacle connector 102 according to the present embodiment also includes the split sleeve 140 that surrounds the outer periphery of the end portion of the ferrule 110 and is disposed adjacent to the ferrule holder 120 in the longitudinal direction. The split sleeve 140 may be disposed within the housing such that half of the length of the sleeve in the longitudinal direction covers the end portion of the ferrule 110. In this case, the optical connection between the ferrule 110 of the plug receptacle connector 102 and the ferrule 103a of the first optical connector 103 can be uniformly protected by the split sleeve 140. Therefore, it is possible to protect the optical connection between the ferrules more reliably and to reduce the optical connection loss due to bending.

Further, the plug receptacle connector 102 according to the present embodiment includes the front end portion 161 of the receptacle frame 160 that holds the split sleeve 140, and a gap is provided between the outer peripheral surface of the split sleeve 140 and the inner peripheral surface of the front end portion 161 that is the sleeve holder. For example, the gap when the center of the outer periphery of the split sleeve 140 and the center of the inner periphery of the sleeve holder coincide with each other may have a width of 0.35 mm or more in the radial direction toward the outside of the ferrule 110. In this case, the split sleeve 140 that protects the optical connection between the ferrules can be moved somewhat freely within the plug frame 130 and receptacle frame 160 that constitute the housing. Therefore, even when bending stress is applied to the split sleeve 140, it is possible to continue protection of the optical connection between the ferrules by the split sleeve 140 and to reduce the optical connection loss due to bending.

Further, in the plug receptacle connector 102 according to the present embodiment, the inner hole 133 of the plug frame 130 which is the anti-rotation structure has a hexagonal cross-sectional shape, and the ferrule holder 120 has the flange part 122 having a hexagonal cross-sectional shape. In this case, rotation of the ferrule 110 can be prevented with a simpler configuration.

Although the optical connector according to the present disclosure has been described above, the present disclosure is not limited to the above embodiments and can be modified as appropriate without departing from the scope of the claims. For example, in the above description, the plug receptacle connectors used for an SC-type optical connector and an LC-type optical connector have been described as examples, but the present disclosure is not limited to the types, and may be applied to plug receptacle connectors used in other types of optical connectors. Further, the configuration of the flange part and the anti-rotation structure of the first embodiment may be applied to the configuration of the flange part and the anti-rotation structure of the second embodiment, and conversely, the configurations of the flange part and the anti-rotation structure of the second embodiment may be applied to the configurations of the flange part and the anti-rotation structure of the first embodiment.

REFERENCE SIGNS LIST 1, 101 Optical connection structure
2, 102 Plug receptacle connector (optical connector)
3, 103 First optical connector
104 Second optical connector
2a Plug side
2b Receptacle side
10, 110, 103a, 104a Ferrule
11, 111 Through hole
12, 112 Optical fiber
12a, 12b Both ends
13, 113 One end
14, 114 The other end
20, 120 Ferrule holder
21, 121 Holder main body
22, 122 Flange part
23a, 23b Recessed portion
23c, 23d Recessed portion
30 Plug frame (anti-rotation structure)
31a, 31b Claw portion
32 Through hole
40, 140, 145 Split sleeve
41, 141 Slit
50 Latch (sleeve holder)
51 Engaging portion
52 Inner peripheral portion
53 Engaging portion
60 Housing
61 Plug portion
62 Receptacle portion
105 Adapter
103b, 104b Built-in optical fiber
130 Plug frame (housing)
131 Housing main body
131a Through hole
132 Inner peripheral portion
133 Inner hole (anti-rotation structure)
134 Latch

160 Receptacle frame (housing)
161 Front end portion
161*a* Protrusion
162 Rear end portion
163 Inner hole
502 Plug receptacle connector
C1, C2 Center
D1 Central region
D7, D8 Portion of length

The invention claimed is:

1. A plug receptacle connector comprising:

a ferrule including a through hole extending in a first direction, the ferrule being configured to hold an optical fiber in the through hole;

a ferrule holder disposed on an outer periphery of the ferrule and fixed to the ferrule;

a housing that accommodates the ferrule and the ferrule holder therein;

an anti-rotation structure provided outside the ferrule and inside the housing to prevent rotation of the ferrule about an axis in the first direction with the ferrule holder;

a split sleeve disposed adjacent to the ferrule holder in the first direction to surround an outer periphery of an end portion of the, ferrule; and a sleeve holder holding the split sleeve, wherein the ferrule holder includes a tubular holder main body that accommodates the ferrule therein, and a flange part that protrudes outward from an outer periphery of the holder main body in a second direction intersecting the first direction, wherein the flange part includes a configuration that fits with the anti-rotation structure, and a center of the flange part in the first direction is located in a central region of the ferrule in the first direction, wherein both ends of the optical fiber that is held within the through hole of the ferrule are exposed from a first end and a second end opposite thereto of the ferrule, respectively, and wherein the split sleeve is located within the housing such that half of a length of the split sleeve, but not an entire length of the split sleeve, in the first direction covers the end portion of the ferrule.

2. The plug receptacle connector according to claim 1, wherein the central region of the ferrule is a region within a range in which a width corresponding to 7.5% of a total length of the ferrule is expanded in each of directions from the center of the ferrule toward both ends of the ferrule with the center of the ferrule in the first direction as a reference.

3. The plug receptacle connector according to claim 1, wherein the central region of the ferrule is a region within a range in which a width corresponding to 5% of a total length of the ferrule is expanded in each of directions from the center of the ferrule toward both ends of the ferrule with the center of the ferrule in the first direction as a reference.

4. The plug receptacle connector according to claim 1, wherein the housing is made of a resin material having a bending elastic modulus of 10000 MPa or more.

5. The plug receptacle connector according to claim 1, wherein the width of the flange part in the first direction is 1 mm or less.

6. The plug receptacle connector according to claim 1, wherein a gap is provided between an outer peripheral surface of the split sleeve and an inner peripheral surface of the sleeve holder, and the gap has a width of 0.35 mm or more in a direction orthogonal to the first direction toward an outside of the ferrule.

7. The plug receptacle connector according to claim 1, wherein the anti-rotation structure has a shape complementary to a cross-sectional shape of the flange part orthogonal to the first direction.

8. The plug receptacle connector according to claim 1, wherein the anti-rotation structure includes a pair of claw portions protruding in the second direction, and the flange part includes a pair of recessed portions that fit with the pair of claw portions.

9. The plug receptacle connector according to claim 1, wherein the anti-rotation structure is a hole having a polygonal cross section, and the flange part has a polygonal cross-section corresponding to a cross-sectional shape of the hole of the anti-rotation structure.

* * * * *